United States Patent [19]

Kaneko

[11] Patent Number: 5,150,474
[45] Date of Patent: Sep. 22, 1992

[54] METHOD FOR TRANSFERRING ARGUMENTS BETWEEN OBJECT PROGRAMS BY SWITCHING ADDRESS MODES ACCORDING TO MODE IDENTIFYING FLAG

[75] Inventor: Takashi Kaneko, Tokyo, Japan

[73] Assignee: NEC Corporation, Tokyo, Japan

[21] Appl. No.: 344,614

[22] Filed: Apr. 28, 1989

[30] Foreign Application Priority Data

Apr. 29, 1988 [JP] Japan .................. 63-105954

[51] Int. Cl.$^5$ .............................................. G06F 9/45
[52] U.S. Cl. ...................................... 395/500; 395/700; 364/DIG. 1; 364/280.1; 364/280.4
[58] Field of Search ... 364/200 MS File, 900 MS File, 364/DIG. 1, DIG. 2; 395/700, 500

[56] References Cited

U.S. PATENT DOCUMENTS

| | | | |
|---|---|---|---|
| 4,241,399 | 12/1980 | Strecker et al. | 364/200 |
| 4,330,822 | 5/1982 | Dodson | 364/200 |
| 4,338,663 | 7/1982 | Strecker et al. | 364/200 |
| 4,736,320 | 4/1988 | Bristol | 364/200 |
| 4,736,321 | 4/1988 | Brown et al. | 364/200 |
| 4,787,034 | 11/1988 | Szoke | 364/200 |
| 4,791,558 | 12/1988 | Chaitin et al. | 364/200 |
| 4,992,971 | 2/1991 | Hayashi | 364/900 |
| 5,097,533 | 3/1992 | Burger et al. | 395/500 |

OTHER PUBLICATIONS

Pyster, A. B., *Compiler Design and Construction*, pp. 281-313 (1980).
Gries, D., *Compiler Construction for Digital Computers*, pp. 187-192 (1971).

*Primary Examiner*—Gareth D. Shaw
*Assistant Examiner*—Matthew C. Fagan
*Attorney, Agent, or Firm*—Foley & Lardner

[57] ABSTRACT

In computer systems, a flag identifying the address mode of a first computer system is stored into a parameter list of a calling object program together with an argument quantity value when the calling object program is generated by the first computer system from a calling source program. The addresses of arguments as specified by the argument quantity value are stored into other word locations of the parameter list. When a called object program is executed by a second computer system, the mode identifying flag is detected from the parameter list of the calling object program, and the addresses of the arguments stored in the parameter list are referenced in an address mode specified by the flag and the referenced arguments are transferred from the calling object program to the called object program.

4 Claims, 4 Drawing Sheets

METHOD FOR TRANSFERRING ARGUMENTS BETWEEN OBJECT PROGRAMS BY SWITCHING ADDRESS MODES ACCORDING TO MODE IDENTIFYING FLAG

BACKGROUND OF THE INVENTION

The present invention relates generally to general purpose computers having different address modes, and more specifically to a compiler for enabling transfer of arguments from a calling object program to a called object program even though the programs have been prepared in different address modes.

As is known in the computer art, a source program described in a high-level language such as FORTRAN is translated into a machine language object program by means of a compiler so that it can be executed by a computer system. The source program comprises a main program which performs principle functions of the computer system and subprograms which are invoked, or called by the main program. When machine-language object programs are executed, arguments which indicate numerical and parameter values are transferred from a calling object program (main program) to a called object program (subroutine subprogram) by reference to a parameter list in which the addresses of the arguments are stored. In order to effect such data transfer, the compiler stores the number of arguments and their addresses into the parameter list in accordance with a particular word address mode which is being used at the time a calling object program is generated. The called object program contains instructions at the entry of each subroutine to read arguments from the parameter list according to a particular word address mode of the computer that was being used at the time the called object program was generated.

However, if the word address mode of a called object program differs from the address mode of a calling object program, the arguments referenced during the time the called object program is being generated from a called source program have meaningless values.

SUMMARY OF THE INVENTION

It is therefore an object of the present invention to enable transfer of arguments from a calling object program to a called object program even though the address mode of a computer in which the calling object program was generated differs from the address mode of a computer in which the called object program was generated.

The present invention provides a method for transferring arguments from a calling object program to a called object program using a parameter list containing addresses of the arguments.

According to a broader aspect of this invention, a flag identifying the address mode of a first computer system is stored into the parameter list of a calling object program when it is generated from a calling source program by the first computer system. When transferring arguments stored in the parameter list of the calling object program to a called object program by a second computer system, the latter is operated by referencing the addresses of the arguments in an address mode specified by the flag and the referenced arguments.

According to a specific aspect of the present invention, the address mode of a first computer system is determined when it is generating a calling object program from a calling source program, the calling object program having a parameter list containing addresses of arguments. A flag identifying the determined address mode is stored into a predetermined word storage location of the parameter list together with an address quantity value and as many addresses of arguments as specified by the address quantity value are stored into other word storage locations of the parameter list. A second computer system is operated for executing a called object program. The second computer system detects the flag from the predetermined word storage location of the parameter list, references the addresses of the arguments stored in the other word storage locations of the parameter list in an address mode specified by the detected flag and transfers the referenced arguments from the calling object program to the called object program.

According to a specific aspect of the present invention, the address mode of a computer system is determined when it is generating a calling object program from a calling source program, the calling object program having a parameter list containing addresses of arguments. A flag identifying the determined address mode is stored into the parameter list together with an address quantity value and as many addresses of arguments as specified by the address quantity value. An object program is prepared in advance before it is called by the calling object program such that, when it is executed, it detects the mode identifying flag from the parameter list of the calling object program, references the addresses of the arguments stored in the parameter list in an address mode specified by the detected flag and transfers the referenced arguments from the calling object program to the called object program.

BRIEF DESCRIPTION OF THE DRAWINGS

The present invention will be described in further detail with reference to the accompanying drawings, in which.

DETAILED DESCRIPTION

Figure 1:
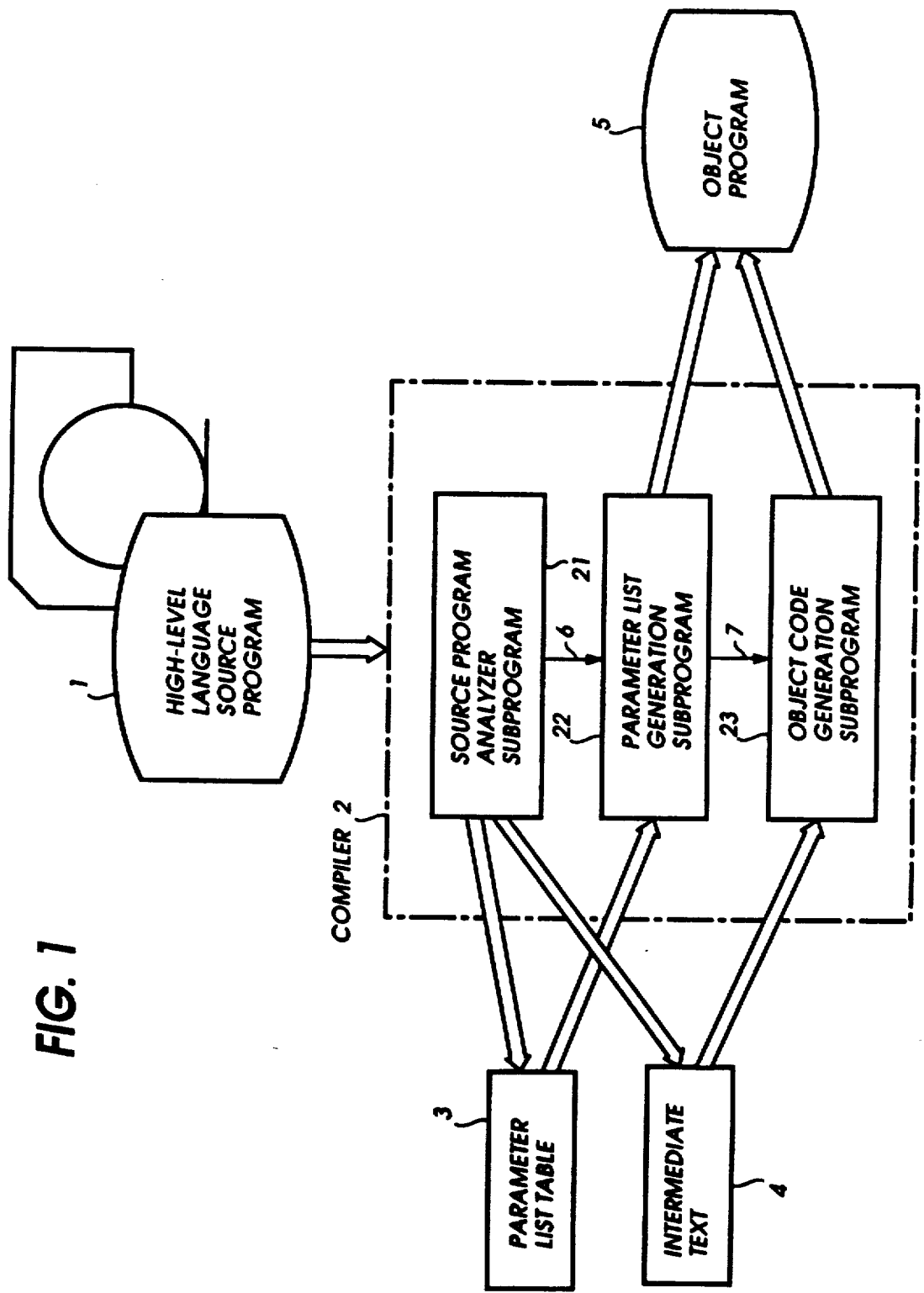
FIG. 1 is a block diagram of a compiler of a computer system embodying the present invention.

Referring now to FIG. 1, there is shown a functional block diagram of of a computer system embodying the present invention. A compiler 2 translates a user's high-level source program 1, such as FORTRAN, into a machine-language object program 5. Compiler 2 is a software-based processor having a source program analyzer subprogram 21, a parameter list generation subprogram 22 and an object code generation subprogram 23, which are executed in sequence as indicated by arrows 6 and 7. Source program analyzer subprogram 21 reads data from the source program 1 and generates a parameter list table 3 and an intermediate text 4 in a manner well known in the art. A portion of the object program 5 is generated by the parameter list generation subprogram 22 as it executes instructions shown in FIG. 2 as well as by the object code generation subprogram 23 as it generates instructions shown in FIG. 5.

Figure 2:
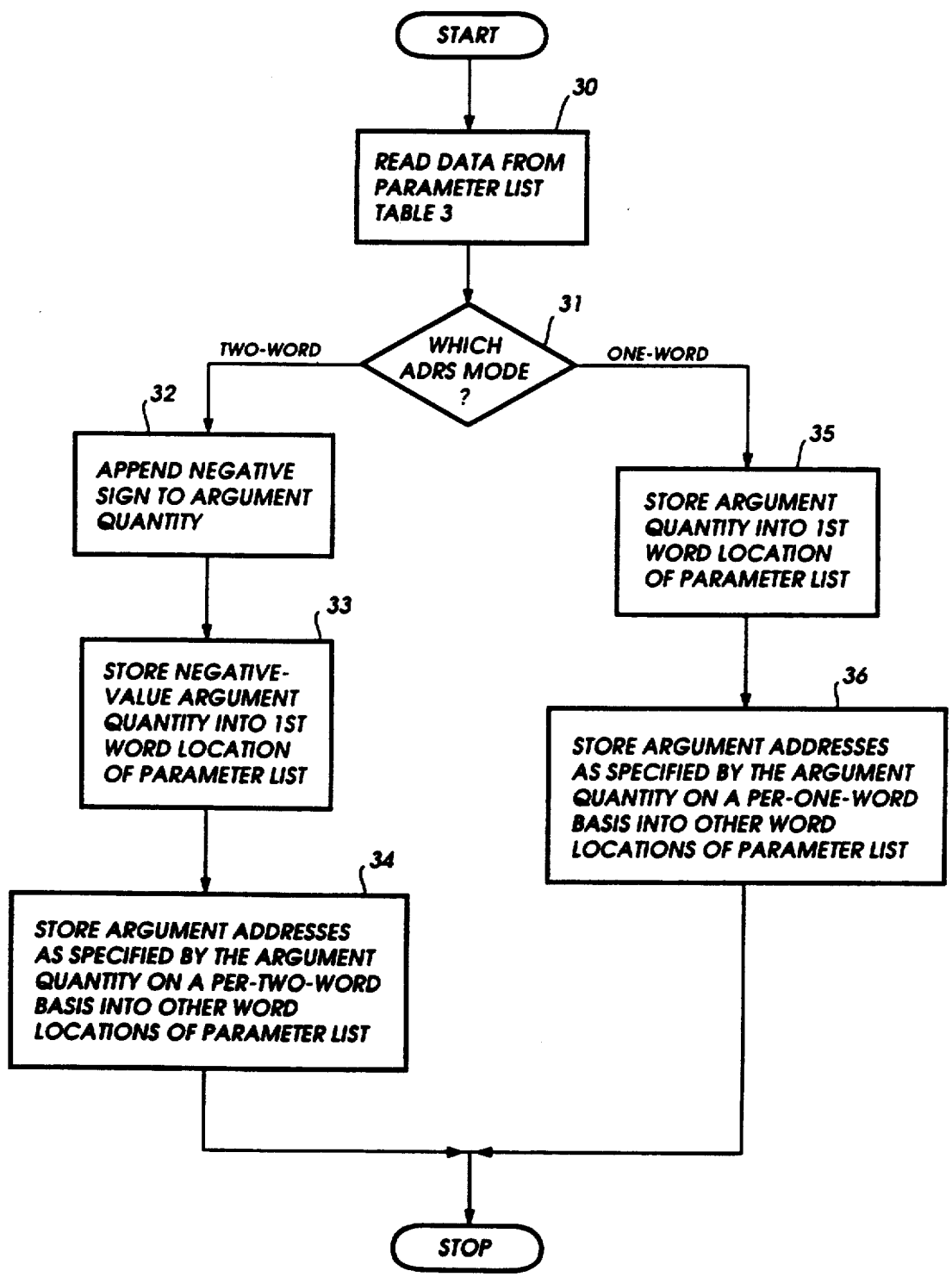
FIG. 2 is a flowchart describing instructions performed by the parameter list generation subprogram of FIG. 1.

In FIG. 2, the parameter list generation subprogram 22 reads data from the parameter list table (block 30) and advances to decision block 31 which checks to see if the computer system is operating in a two-word address mode or a one-word address mode. If the computer system is in two-word address mode, the exit is to operations block 32 which directs the appending of a negative sign to an argument quantity value. Exit then is to operations block 33 which directs the writing of the negative argument quantity value into the first word location of a parameter list prepared in an object program. Operations block 33 is followed by block 34 which directs the writing of an argument for as many argument for addresses as specified by the argument quantity value now stored in the first word location of the parameter list on a per-two-word basis into the other word locations of the list beginning with the second word location.

If the computer is operating in a one-word address mode, the exit from decision block 31 is to operations block 35 which directs the writing of an argument quantity value into the first word location of the parameter list without appending a negative sign. Parameter list generation subprogram 22 then advances to operations block 36 which directs the writing of as many argument addresses as specified by the argument quantity value stored in the first word location of the parameter list by the execution of block 35 into the other word locations of the list on a per-one-word basis beginning with the second word location.

Figure 3:
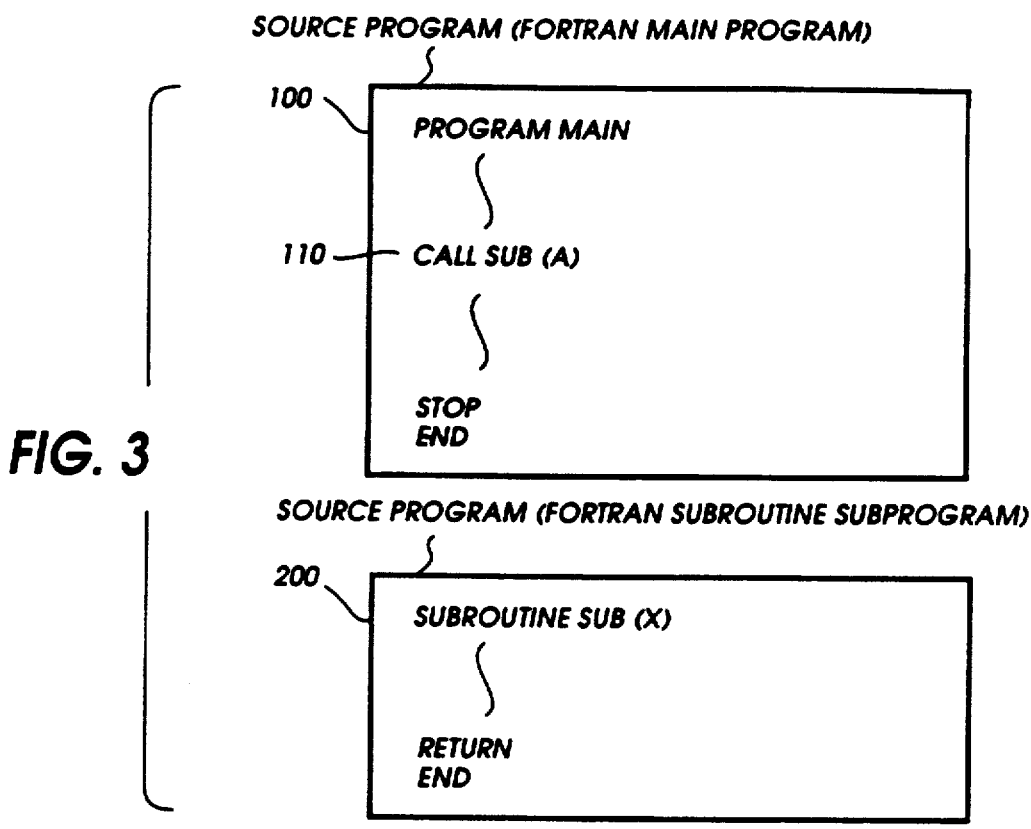
FIG. 3 is an illustration of source programs.
Figure 4:
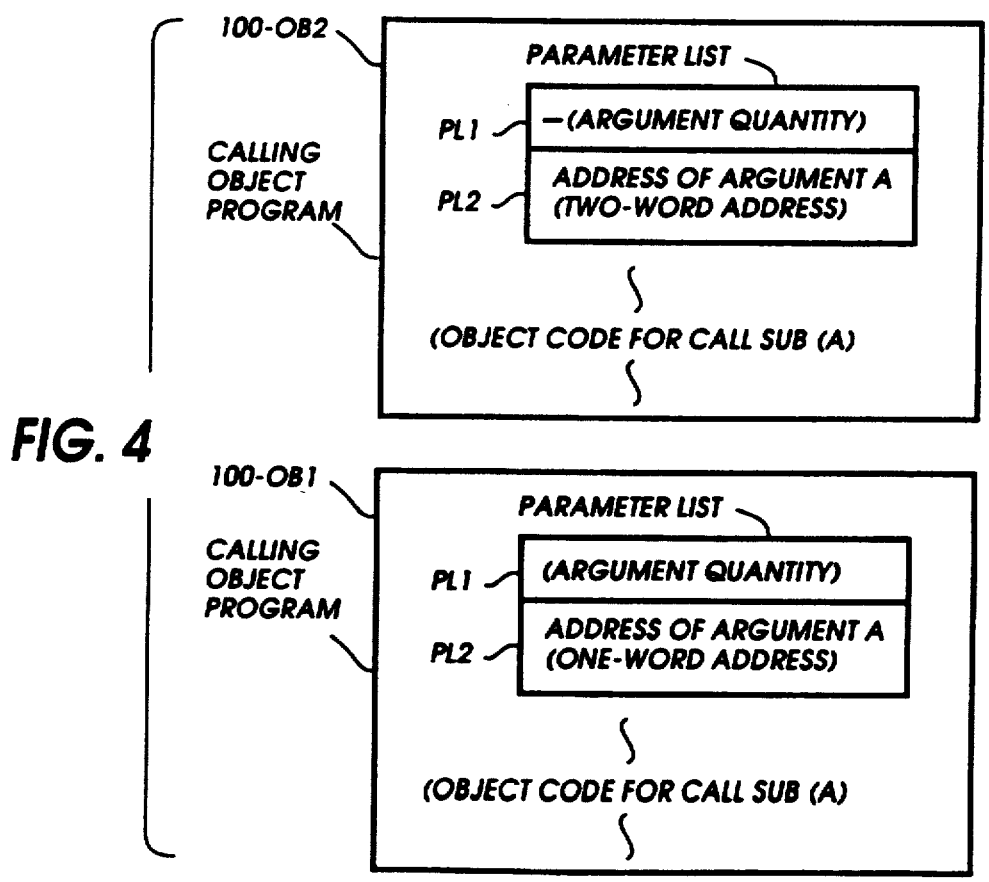
FIG. 4 is an illustration of calling object programs which are respectively generated during two-word and one-word address modes.

FIG. 3 illustrates the source program as containing a main program 100 which includes a statement 110 that calls a FORTRAN subroutine subprogram SUB with an argument "A", an further illustrates a subroutine subprogram 200 which is called by the source program 100. FIG. 4 illustrates a calling object program 100-OB2 which is derived by the parameter list generation subprogram 22 from the main program 100 during two-word address modes and a calling object program 100-OB1 which is derived from the same main program during one-word address modes. Calling object program 100-OB2 contains a parameter list including a plurality of words, only first and second words being illustrated for simplicity.

During the two-word address mode, the first word PL1 of object program 100-OB2 is set to a negative argument quantity value by the parameter list generation subprogram 22 as it executes operations blocks 32 and 33. Thereafter, the second word PL2 of object program 100-OB2 is set to the address of argument "A" on a per-two-word address basis. The process is continued by setting the other word locations to the addresses as specified by the argument quantity value stored in the first word location as operations block 34 is being executed. During the one-word address mode, the first word PL1 of object program 100-OB1 is set to an argument quantity value by the parameter list generation subprogram 22 as it executes operations block 35. The second word PL2 of object program 100-OB1 is set to the address of argument "A" on a per-one-word address basis and the process is continued by setting the other word locations to the addresses as specified by the argument quantity value stored in the first word location as operations block 36 is being executed.

Figure 5:
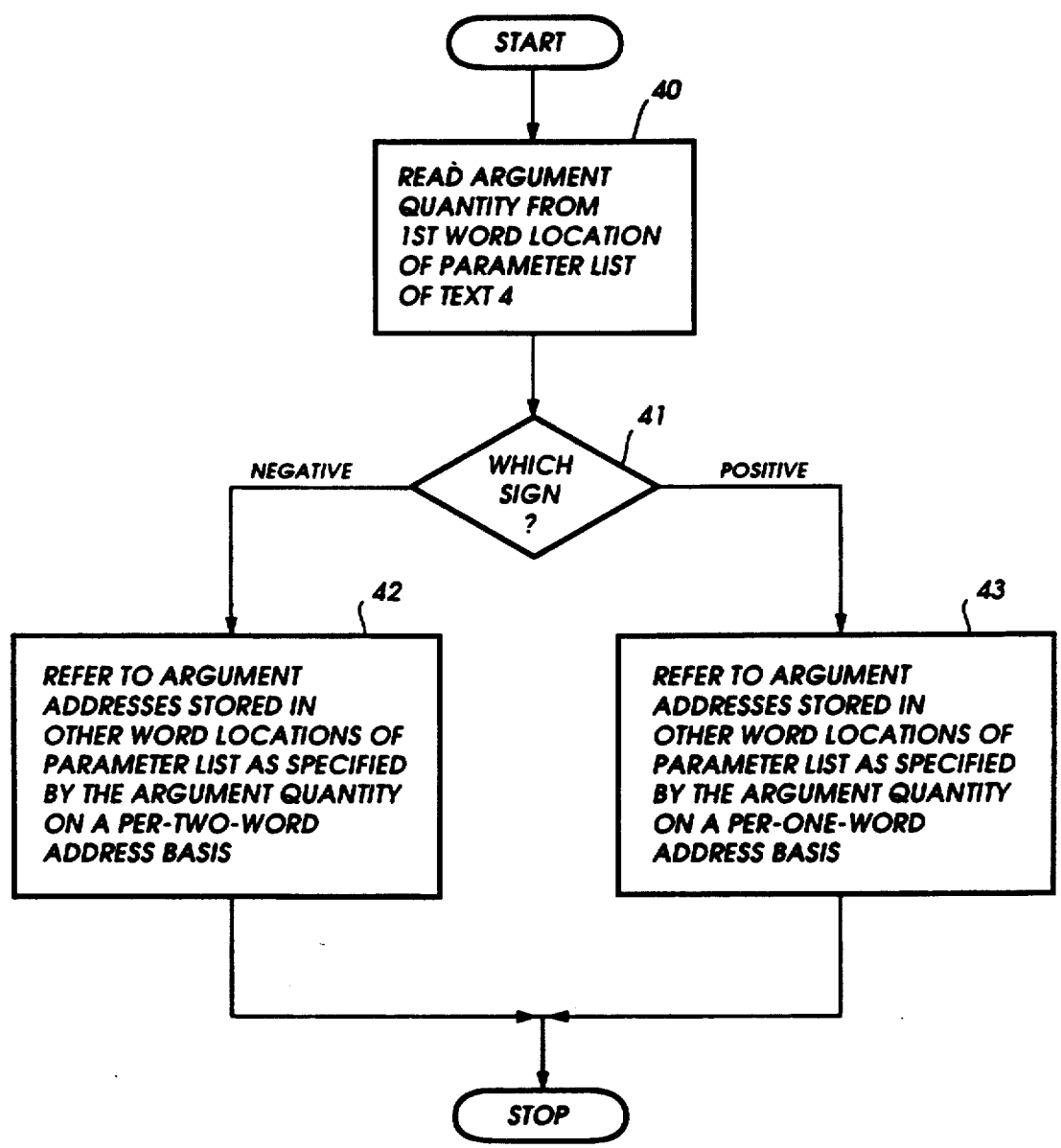
FIG. 5 is a flowchart describing instructions performed by the object code generation subprogram of FIG. 1 during a compiling process for the entry point of execution of each subroutine of a called object program.

During the process of compiling a called object program, object code generation subprogram 23 generates a series of instructions as shown in FIG. 5 for the entry point of the execution of subroutine program 200 of the called object program, which can be called by source program 100. The parameter list prepared by parameter list generation subprogram 22 in a manner as described above is generated in the intermediate text 4. When the called object program is executed, argument quantity data is initially read from the first word location of the parameter list in the calling object program by operations block 40. Exit then is to decision block 41 which checks to see if the argument quantity value is negative or positive. If negative, control proceeds to operations block 42 which refers to argument addresses of the other word locations of the parameter list of the intermediate text 4 on a per-two-word address basis, beginning with the second word location, with the referenced argument addresses being specified by the argument quantity data. If the argument quantity value has a positive sign, exit is to operations block 43 which refers to argument addresses of the other word locations of the parameter list on a per-one-word basis, beginning with the second word location, with the referenced addresses being also specified by the argument quantity data. Therefore, it can be seen that an object program is ready to be called by a calling object program.

It is assumed that a called object program is resident on the same computer as that of the calling object program. At the beginning of the execution of the called object program, a mode identifying flag is read from the calling object program and reference to the parameter list is appropriately switched according to the flag during the execution of the called object program, so that arguments are referenced in an address mode specified by the flag and correctly transferred from the calling object program to the called object program. In this way, argument data can be transferred from a calling object program which is prepared by a first computer in a two-word mode to a called object program which is prepared by a second computer in a one-word address mode.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for computer system in transferring arguments from a calling object program to a called object program using a parameter list contained in said calling object program, said parameter list containing addresses of said arguments, comprising the steps of:

storing an address mode identifying flag into said parameter list when said calling object program is generated from a calling source program by a first computer system, said flag identifying an address mode of said first computer system;

executing said calling object program in a second computer system; and upon execution of said called object program in said second computer system, detecting said address mode identifying flag in said parameter list, referencing said argument addresses stored in said parameter list in the address mode specified by said detected flag, and transferring the arguments at said referenced addresses from said calling object program to said called object program.

2. A method for computer systems, comprising the steps of:
 a) generating a calling object program from a calling source program by a first computer system, said calling object program including a parameter list, said generating step including the steps of
  i) determining an address mode of said first computer system,
  ii) storing a flag identifying the determined address mode into a predetermined word storage location of said parameter list together with an address quantity value, and
  iii) storing as many addresses of arguments as specified by said address quantity value into other word storage locations of said parameter list;
 b) executing said calling object program in a second computer system; and
 c) upon execution of a called object program in said second computer system, detecting said flag from said predetermined word storage location of said parameter list, referencing said argument addresses stored in said other word locations of said parameter list in the address mode specified by said detected flag, and transferring the arguments at said referenced addresses from said calling object program to said called object program.

3. A method as claimed in claim 2, wherein the address mode of said first computer system is either a one-word address mode in which said first computer system operates on a per-one-word address basis or a two-word address mode in which said first computer system operates on a per-two-word address basis.

4. A method as claimed in claim 2, wherein said address mode identifying flag is either a negative sign or a positive sign, depending on the address mode of the first computer system.

* * * * *